Figure 1:
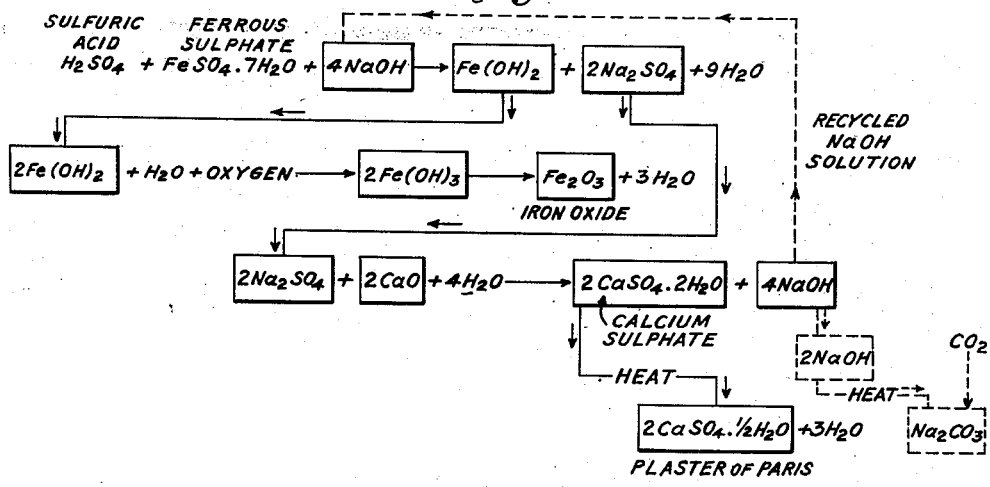

June 16, 1953   A. L. NUGEY   2,642,334
METHOD OF NEUTRALIZING INDUSTRIAL WASTE
Filed Sept. 20, 1947

INVENTOR.
Anthony L. Nugey.
BY
William F. Nickel
ATTORNEY.

UNITED STATES PATENT OFFICE 2,642,334

METHOD OF NEUTRALIZING INDUSTRIAL WASTE

Anthony L. Nugey, Rahway, N. J.

Application September 20, 1947, Serial No. 775,201

3 Claims. (Cl. 23—63)

This invention relates to the treatment of undesirable substances that result from industrial processes and have toxic or other deleterious characteristics; and more particularly to a process or method of preventing the pollution of streams by extracting, recovering or converting injurious by-products of industrial wastes.

An object of the invention is to facilitate the manufacture of compounds needed in the production of pigments and to simplify problems in connection therewith.

In this field white lead, zinc oxide, lithopone, etc., have long been recognized; and more recently titanium dioxide ($TiO_2$) has come into widespread use because it has more covering power due to its greater opacity.

This oxide is obtained from rutile and/or ilmenite, which are the chief sources for titanium dioxide ($TiO_2$). The latter is probably employed more extensively for this purpose.

Briefly, the ore is first ground and then digested in a solution of strong sulphuric acid ($H_2SO_4$), in the presence of water. When the reducing operation has been completed, the liquid is clarified, vacuum evaporated, and filtered; and the resultant precipitate is dried, calcined, air-separated and finely pulverized and subsequently made up into marketable packages.

The liquid filtrate which is discharged from the several filtering and precipitating operations has a specific gravity of approximately 1.065 (equal to 9 deg. Bé.) and its weight averages 8.87 lbs. per gallon. The analysis of this filtrate will vary with the control of the processing operations but the average composition is:

8½% $H_2SO_4$ (sulfuric acid)
11% $FeSO_4.7H_2O$ (ferrous sulphate)
80½% $H_2O$ (water)

In previous attempts to recover the chemical compounds from the filtrate, the sulphuric acid ($H_2SO_4$) and the iron (Fe) could not be converted into iron sulfide ($Fe_2S$) as long as they are in solution. The ferrous sulphate ($FeSO_4.7H_2O$) is so soluble in the $H_2O$ (water) that it is necessary to make a 75 percent solution to get it saturated. Also it is not commercially feasible to extract the sulfuric acid ($H_2SO_4$), as such.

Another object of my invention is to provide a simple and commercially practical process for removing the chemical compounds in a continuous manner, and at the same time to overcome the present difficult problem of disposing of this very corrosive filtrate.

At present manufacturers of titanium dioxide ($TiO_2$) often discharge this filtrate into rivers and other streams as a waste effluent, but public authorities are adopting corrective measures to prohibit the continuance of this practice. Some manufacturers with plants adjacent to sea-coasts discharge this highly corrosive filtrate into the ocean. This is not only costly to the manufacturer, who must provide suitable rubber lined vessels to transport this filtrate off-shore, but further entails great damage to fish and other marine life, and is apt to ruin long stretches of beach front.

I have successfully transformed the injurious contents of this filtrate into calcium sulfate ($CaSO_4.2H_2O$), or plaster of Paris ($CaSO_4.\frac{1}{2}H_2O$), and iron oxide ($Fe_2O_3$), by the use of cheap chemical reagents and simultaneously neutralized the filtrate; thus rendering it harmless and permitting it to be discharged freely without causing pollution of natural waters. I also enable the manufacturer to save money and in addition increase the proceeds of the methods heretofore utilized.

The nature and advantages of my invention will fully appear in the following description; and the novel features pointed out in the appended claims.

Figure 1 indicates graphically the chemical reactions performed in my invention.

Figure 2:
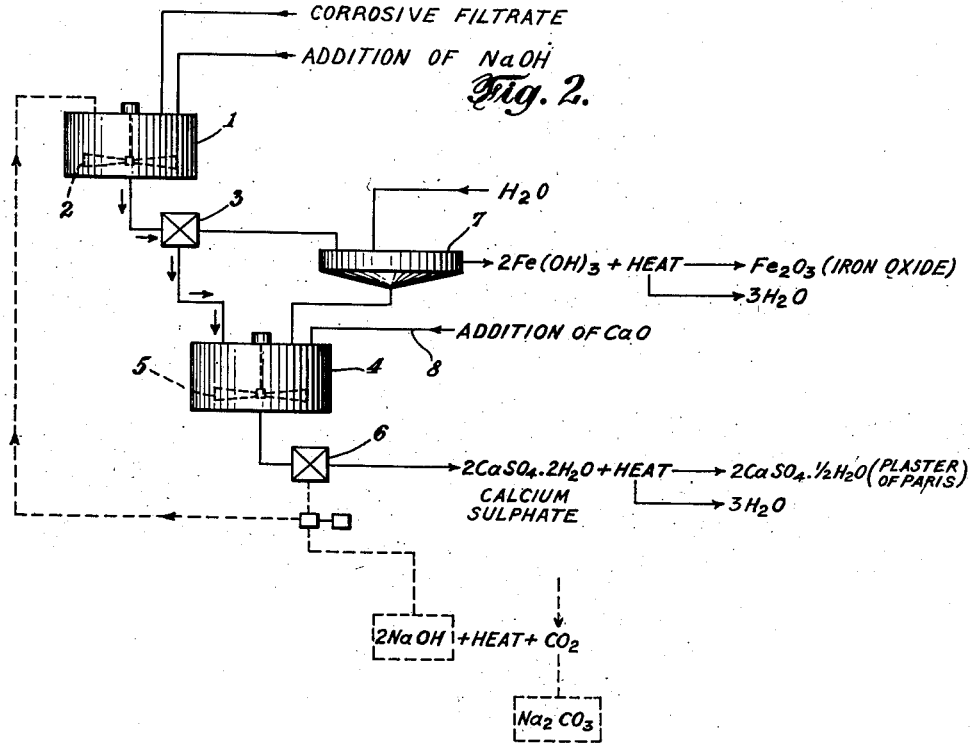

Figure 2 shows apparatus for effecting the recovery of the by-products.

The initial step requires the addition of 0.90 lb. of sodium hydroxide (NaOH) per 1 gallon of the corrosive filtrate. This is placed in the mixing tank 1, and while the caustic soda is added the agitator 2 in the tank is continually operating. The filtrate from the tank then passes thru a continuous filter indicated at 3, to separate and retain the filter cake, which, after being properly washed with water and then heated, becomes the by-product iron oxide ($Fe_2O_3$).

The filter cake of iron oxide ($Fe_2O_3$) is washed in a vat 7 to which water is added and the mass agitated. The resultant iron hydroxide $Fe(OH)_3$ is heated to produce iron oxide ($Fe_2O_3$) and water. The wash water in the vat 7 drains into the tank 4 and the calcium oxide (CaO) is supplied to the tank 4 through a pipe 8.

The liquid filtrate from the filter 3 passes into the mixing tank 4 containing an agitator 5. Here the addition of calcium oxide or quick lime (0.36 lb. of CaO) per 1 gallon is made. The filter 6 retains the calcium sulphate ($CaSO_4.2H_2O$), which can readily be converted into plaster of Paris ($CaSO_4.\frac{1}{2}H_2O$) by heating. The liquid filtrate leaving the filter 6 contains a predominant percentage of sodium hydroxide (NaOH), which is recycled back into the tank 1; and after the operation becomes continuous, less than 10% of the original quantity of sodium hydroxide (NaOH) needs to be added to make up the loss sustained in the original chemical reaction. On this basis the recovery of commercial by-products per 1 gallon of the corrosive filtrate will be approximately as follows: 4½ ounces of iron oxide ($Fe_2O_3$) and 2 lbs. of calcium sulphate ($CaSO_4.2H_2O$), and the entire waste effluent is completely neutralized.

Figure 1 demonstrates that the sodium hydroxide (NaOH) solution may be recycled once or several times, into the tank 1; thereby necessitating relatively small amounts of fresh charges of sodium hydroxide into this tank. In any event, when excessive amounts of this solution becomes available, a portion, or all of it may be converted by treatment with carbon dioxide ($CO_2$) (see Figure 2), into either anhydrous sodium carbonate ($Na_2CO_3$), of such forms as $Na_2CO_3.2H_2O$, or $Na_2CO_3.10H_2O$, all depending upon how far down the sodium salts are dried. The yield of anhydrous sodium carbonate ($Na_2CO_3$), will amount to 1.11 lbs.; or instead of this byproduct, I can obtain a yield of 3.22 lbs. of carbonate of the composition $Na_2CO_3.10H_2O$, which is an essential alkali for soap making.

A second alternate within the scope of this invention is that a portion of the sodium hydroxide NaOH solution will be recycled as shown in Figure 1; and the remainder of the strong sodium hydroxide solution will be neutralized with a low grade hydrochloric acid (HCl), (not shown in illustration) which will form common sodium (NaCl) chloride. This may be readily discharged into streams without polluting them, especially the sea. Thus a cheap and safe method of disposing of the excess sodium hydroxide is realized.

While the foregoing specification discloses my invention fully, I do not wish to be limited to the exact details of procedure stated, but reserve the right to adopt variations which do not depart from the principle of the invention.

For example, calcium or potassium hydroxides could be used instead of sodium hydroxide in all of the above-mentioned results obtained thereby in the performance of the process of this invention. The improvement is particularly valuable in the recovery and neutralization of waste filtrates resulting from the manufacture of titanium dioxide.

Having described my invention, what I believe to be new is:

1. The process of treating liquid industrial waste containing sulphuric acid and ferrous sulphate, consisting in adding sodium hydroxide in sufficient quantity to neutralize the acid to the liquid and agitating the mixture, filtering and removing the iron hydroxide filter cake, heating the latter to form iron oxide and water, adding oxide of lime to the liquid filtrate in sufficient quantity to convert the filtrate into a liquid mixture of calcium sulphate and sodium hydroxide and agitating the mixture, filtering said last-named mixture to remove the calcium sulphate, returning part of the sodium hydroxide in said last-named mixture to replenish the sodium hydroxide originally used, and treating the remainder of the second filtrate with heat and carbon dioxide to form sodium carbonate.

2. The process of treating liquid industrial waste according to claim 1 wherein approximately 0.9 lb. of sodium hydroxide is first added to each gallon of said liquid waste; and approximately 0.36 of oxide if lime is utilized with each gallon of liquid filtrate to produce sodium hydroxide and calcium sulphate.

3. The process of treating liquid industrial waste according to claim 2 wherein approximately 0.9 lb. of sodium hydroxide is first added to each gallon of said liquid waste; and approximately 0.36 of oxide if lime is utilized with each gallon of liquid filtrate to produce sodium hydroxide and calcium sulphate, and the first-named filter cake is washed with water, which is afterwards discharged into the second-named mixture.

ANTHONY L. NUGEY.

References Cited in the file of this patent

UNITED STATES PATENTS

| Number | Name | Date |
|---|---|---|
| 53,839 | Lahmann | Apr. 10, 1866 |
| 708,585 | Ramage | Sept. 9, 1902 |
| 802,928 | Fireman | Oct. 24, 1905 |
| 1,254,009 | Hughes | Jan. 15, 1918 |
| 1,547,624 | Smith et al. | July 28, 1925 |
| 1,596,363 | Mac Millan | Aug. 17, 1926 |
| 1,637,514 | Bradley | Aug. 2, 1927 |
| 2,072,177 | Moore | Mar. 2, 1937 |
| 2,258,310 | Abbott | Oct. 7, 1941 |
| 2,271,524 | Marek | Feb. 3, 1942 |